M. LOUVIERE & D. BROUSSARD.
HORSE RELEASER.
APPLICATION FILED OCT. 8, 1908.
911,310.
Patented Feb. 2, 1909.
2 SHEETS—SHEET 1.
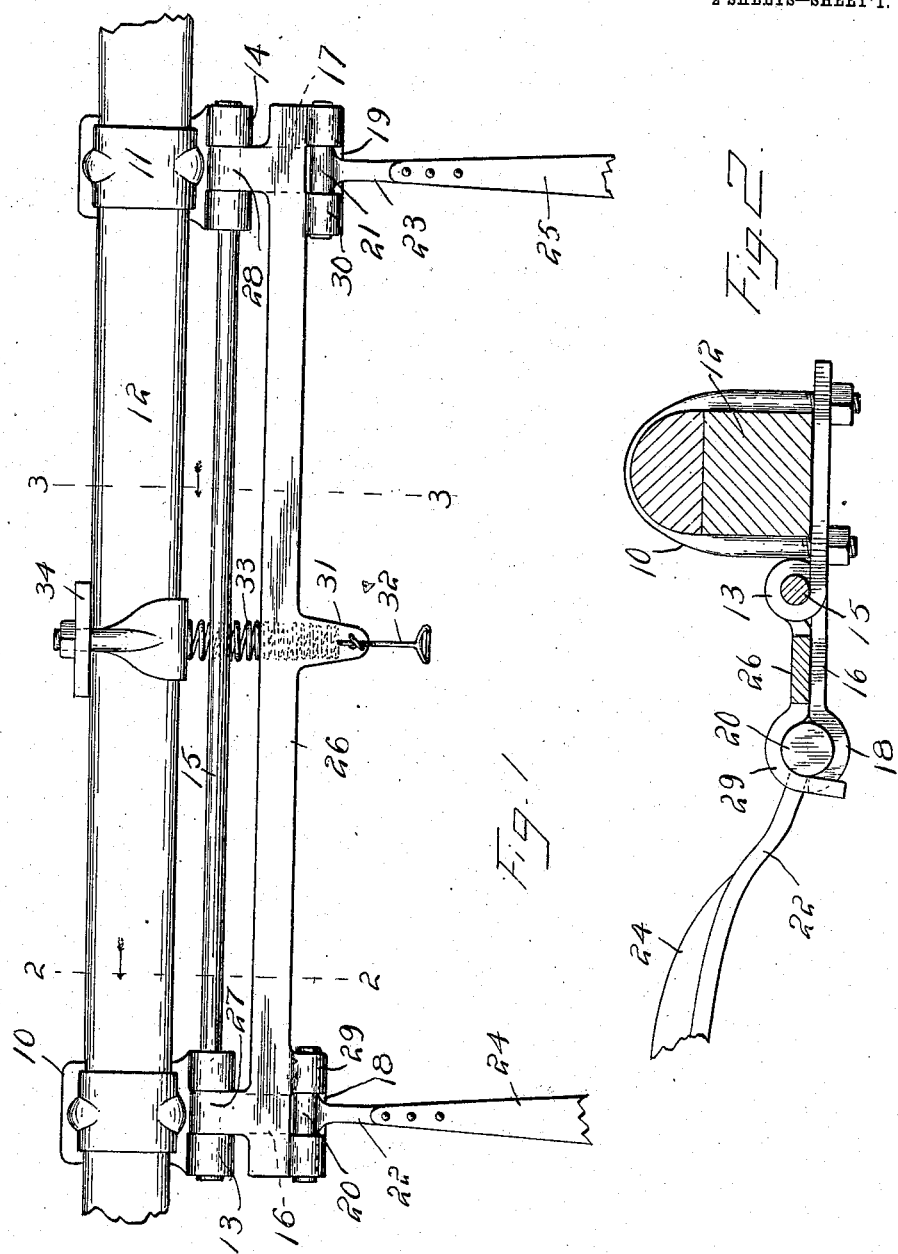

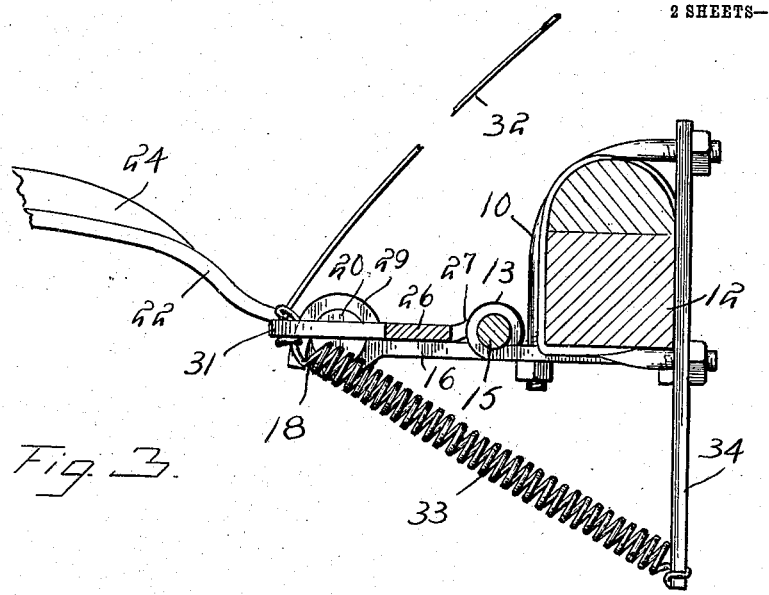
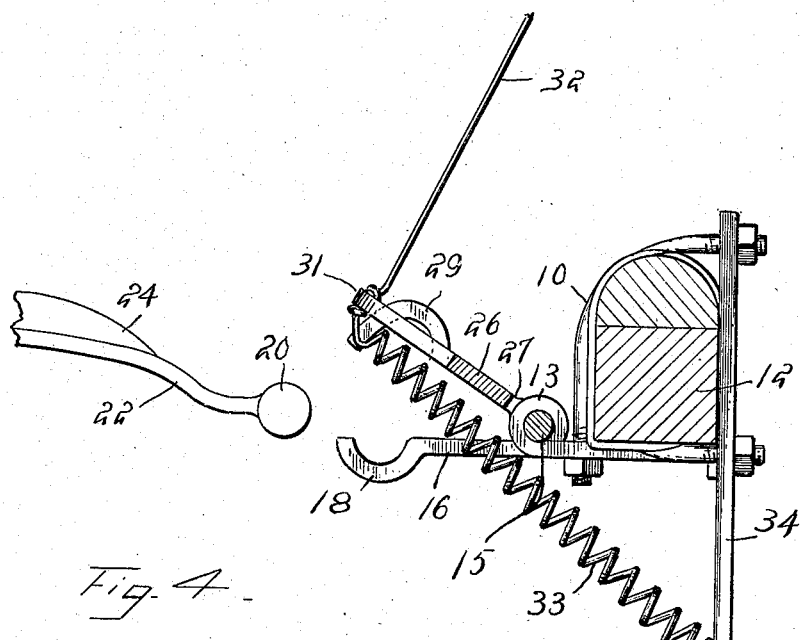

UNITED STATES PATENT OFFICE.

MARIUS LOUVIERE AND DAMAS BROUSSARD, OF LOREAUVILLE, LOUISIANA.

HORSE-RELEASER.

No. 911,310.    Specification of Letters Patent.    Patented Feb. 2, 1909.

Application filed October 8, 1908. Serial No. 456,751.

*To all whom it may concern:*

Be it known that we, MARIUS LOUVIERE and DAMAS BROUSSARD, citizens of the United States, residing at Loreauville, in the parish of Iberia, State of Louisiana, have invented certain new and useful Improvements in Horse-Releasers; and we do hereby declare the following to be a full, clear, and exact description of the invention, such as will enable others skilled in the art to which it appertains to make and use the same.

This invention relates to horse releasers, and has for one of its objects to simplify and improve the construction and increase the efficiency and utility of devices of this character.

Another object of the invention is to provide a simply constructed device of this character which may be readily attached to any vehicle axle and without structural changes therein.

With these and other objects in view the invention consists in supporting devices having means for attachment to an axle and provided with half bearings, a bar swinging from the supporting devices and provided with fingers bearing over the half bearings and operating to support draft appliances therein, the bar yieldably supported, and with means under the control of the driver for releasing the bar and its fingers from the draft appliances.

The invention further consists in certain novel features of construction as hereafter shown and described and then specifically pointed out in the claims, and in the drawings illustrative of the preferred embodiment of the invention, Figure 1 is a plan view of the forward axle and a portion of the thills of a vehicle, with the improvements applied. Fig. 2 is a section on the line 2—2 of Fig. 1. Fig. 3 is a section on the line 3—3 of Fig. 1. Fig. 4 is a sectional view with the parts in released position.

The improved device comprises two clips 10—11 attached to the forward axle 12 and which replace the ordinary thill or tongue clips, and are provided with spaced eyes 13—14 through which pins extend, the pins being preferably in the form of a single rod 15 extending between the two clips, as shown.

Extending from the clips 10—11 are arms 16—17 having half bearings 18—19 to receive T heads 20—21 forming the terminals of the thill irons 22—23, the latter connected to the thills represented at 24—25 in the usual manner.

Extending parallel to the axle 12 is a bar 26 having lateral eyes 27—28 at the ends engaging around the rod 15 between the spaced eyes 13—14, whereby the bar is swingingly coupled to the axle.

Extending from the bar 26 opposite the eyes 27—28 are spaced lugs or fingers 29—30 arranged in pairs, one pair bearing over the projecting ends of the T head 20 and the other pair bearing over the projecting ends of the T head 21, and completing the coupling between the thills and the axle.

Extending from the bar 26 is an arm 31 from which a pull cord or wire 32 leads to a point convenient to the driver upon the seat in the vehicle.

Connected at one end to the arm 31 is a spring 33, the other end of the spring being connected as by a clip 34 to the axle 12, and exerting its force to maintain the arm 26 and its fingers 29—30 in engagement with the T head members 20—21.

While the improved device is shown applied to a pair of thills, it will be obvious that the same attachment may be employed in connection with the draft appliances of a tongue or pole for two horses, without structural change, but as the changes necessary to be made between the arrangement employed for the use of the device in connection with a tongue and that employed in connection with a pair of thills are immaterial and unimportant, it is not deemed necessary to illustrate them.

The improved device is simple in construction, can be inexpensively manufactured, and applied to the various forms and sizes of axles and the draft appliances of vehicles.

What is claimed, is:—

1. A device of the class described, supporting devices having means for attachment to an axle and a half bearing, a bar swinging upon said supporting devices and with fingers bearing over said half bearings, and extending below the same and with a forwardly extending arm, said half bearings and fingers arranged to support draft appliances between them, a bar adapted to be connected to an axle and extending downwardly therefrom, a spring connected at the ends between said arm and bar, and means under the control of the driver for elevating said bar and its fingers.

2. In a device of the class described, supporting devices each comprising a plate having spaced clefts forming three longitudinally extending tongues, the side tongues bent into spaced eyes and the central tongue bent into a half bearing, a draft appliance engaging in said half bearing, a bar having lateral eyes engaging between the eyes of the plates and with spaced lateral fingers curving downwardly engaging over the half bearings and the draft appliances therein, a rod extending through the eyes of the plates and of the bar, a spring operating to maintain the bar and its fingers yieldably in engagement with the half bearings, and means under the control of the driver for releasing said bar and its fingers from the draft appliances.

In testimony whereof, we affix our signatures, in presence of two witnesses.

MARIUS LOUVIERE.
DAMAS BROUSSARD.

Witnesses:
 LOUIS INDEST,
 A. J. BROUSSARD.